United States Patent [19]
West

[11] 4,402,132
[45] Sep. 6, 1983

[54] DEVICE FOR ATTACHING INSULATOR PODS TO WIRE TERMINALS

[75] Inventor: Theodore V. West, Michigan City, Ind.

[73] Assignee: Burcliff Industries, Inc., Mishawaka, Ind.

[21] Appl. No.: 250,434

[22] Filed: Apr. 2, 1981

[51] Int. Cl.³ .............................................. B23P 19/00
[52] U.S. Cl. ........................................ 29/759; 29/760; 29/631
[58] Field of Search ................. 29/631, 748, 754, 747, 29/564.1, 564.6, 857, 759, 760

[56] References Cited

U.S. PATENT DOCUMENTS

| | | | |
|---|---|---|---|
| 3,329,002 | 4/1967 | Schwalm | 29/564.1 X |
| 3,537,167 | 11/1970 | Lawson | 29/564.1 |
| 3,667,102 | 6/1972 | Guillemette et al. | 29/747 |
| 3,734,992 | 5/1973 | Masino et al. | 29/564.6 X |
| 4,139,937 | 2/1979 | L'Homme | 29/754 |
| 4,231,152 | 11/1980 | Kubota et al. | 29/747 X |
| 4,235,015 | 11/1980 | Funcik et al. | 29/857 |

FOREIGN PATENT DOCUMENTS

| | | | |
|---|---|---|---|
| 1152764 | 5/1969 | United Kingdom | 29/631 |
| 1374849 | 11/1974 | United Kingdom | 29/747 |

*Primary Examiner*—Francis S. Husar
*Assistant Examiner*—Carl J. Arbes
*Attorney, Agent, or Firm*—Marmaduke A. Hobbs; Raymond W. Campbell

[57] ABSTRACT

A device for attaching insulator pods to wires having terminals thereon which is mounted on, for operation with, a wire cutter. A vibratory bowl arranges pods in position for attachment to the terminal on the wire, and wire grippers and terminal grippers are provided for holding the wire and terminal as the pod is attached to the terminal. A pneumatic cylinder moves the pod from the arranged position onto the terminal. As the pod is moved onto the terminal, the terminal gripper is encountered and is moved rearwardly on the terminal for a distance and then away from the terminal, permitting the pod to be slid fully onto the terminal. A set screw disposed between the wire gripper and terminal gripper is encountered by the pod as the pod is slid onto the terminal and causes the pod to angle upward slightly, thereby locking the pod in place on the terminal.

15 Claims, 12 Drawing Figures

Fig. 1
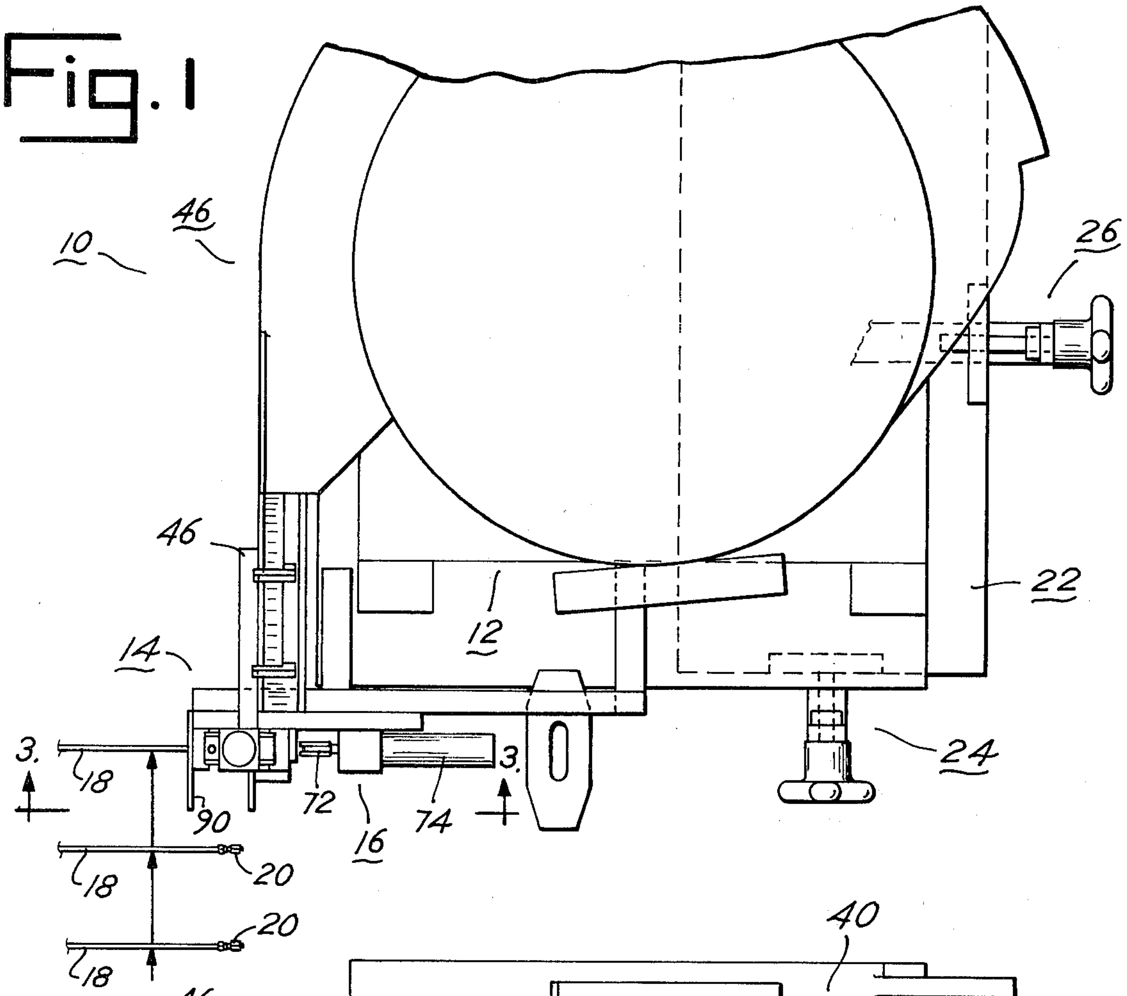
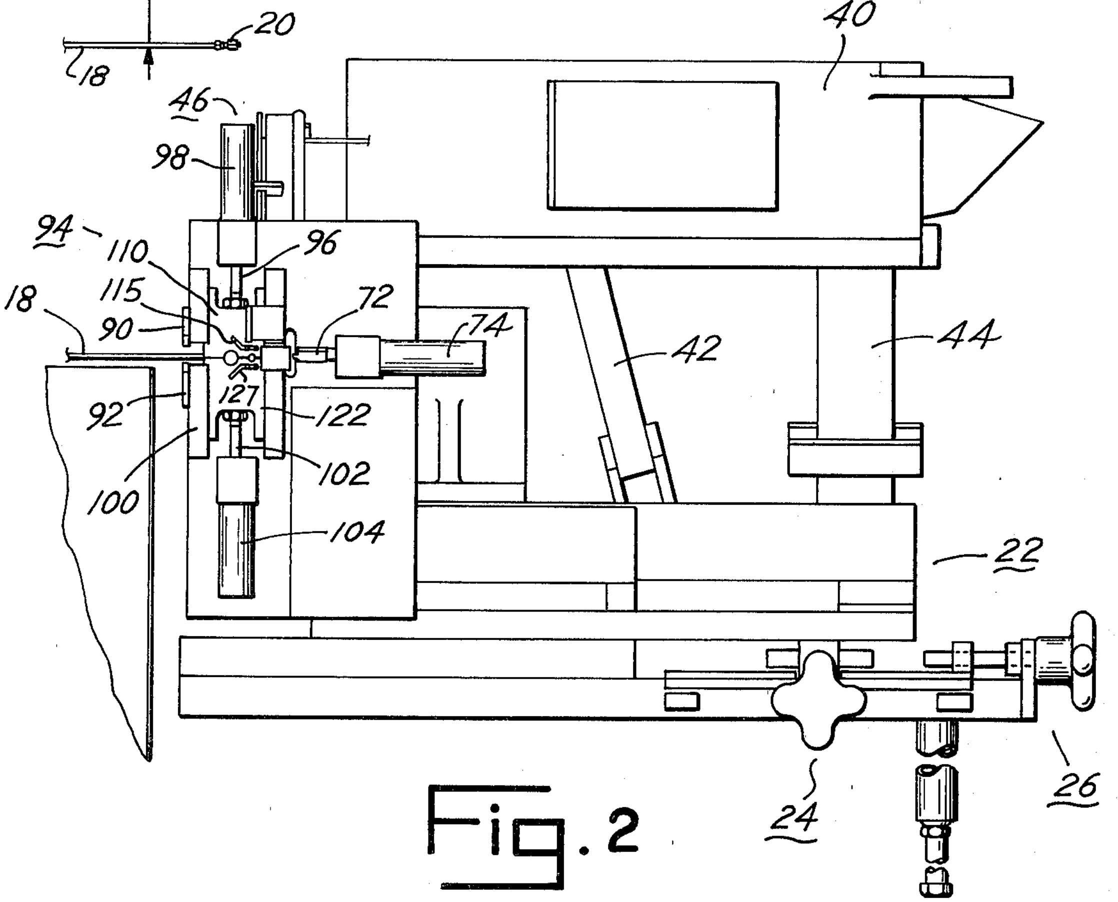
Fig. 2

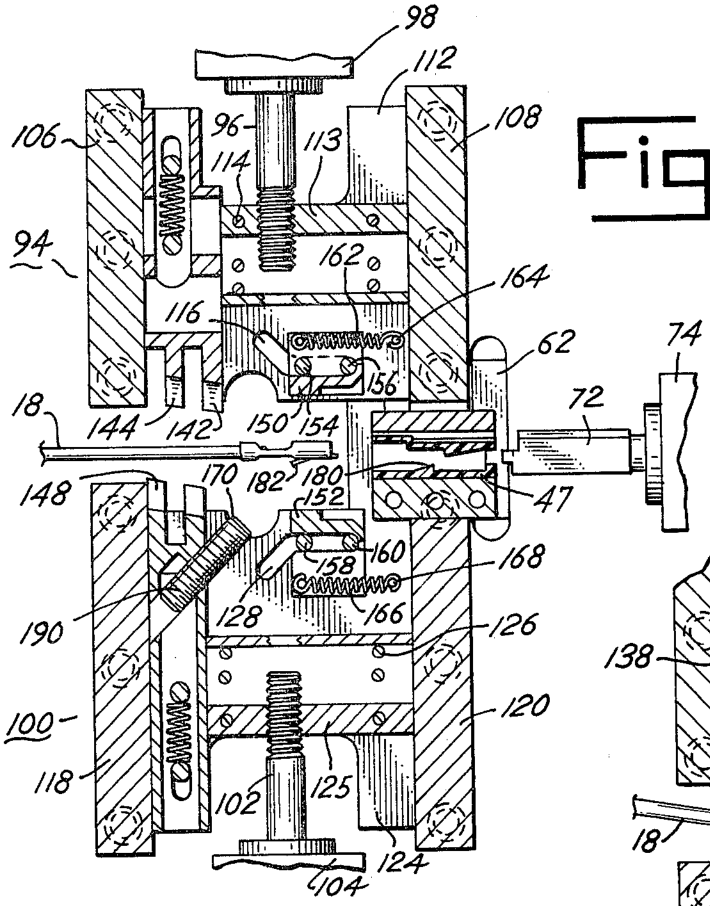
Fig. 9
Fig. 10
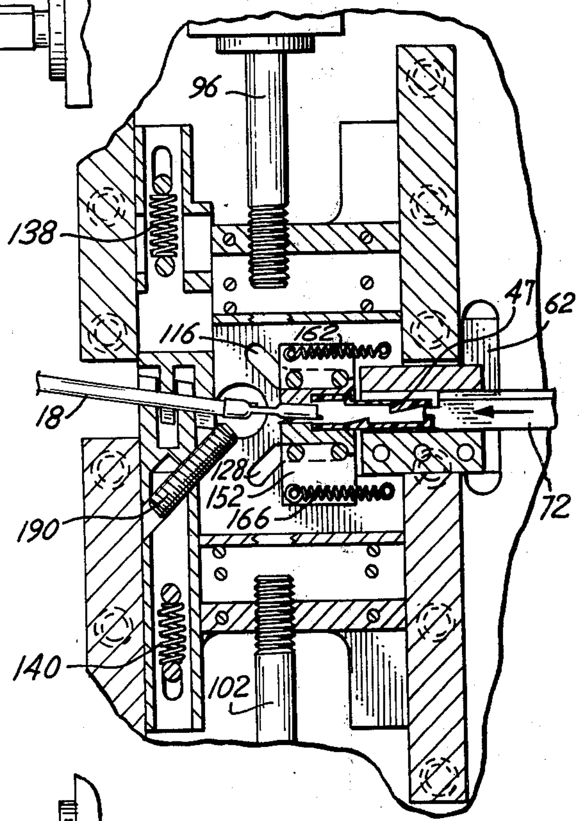
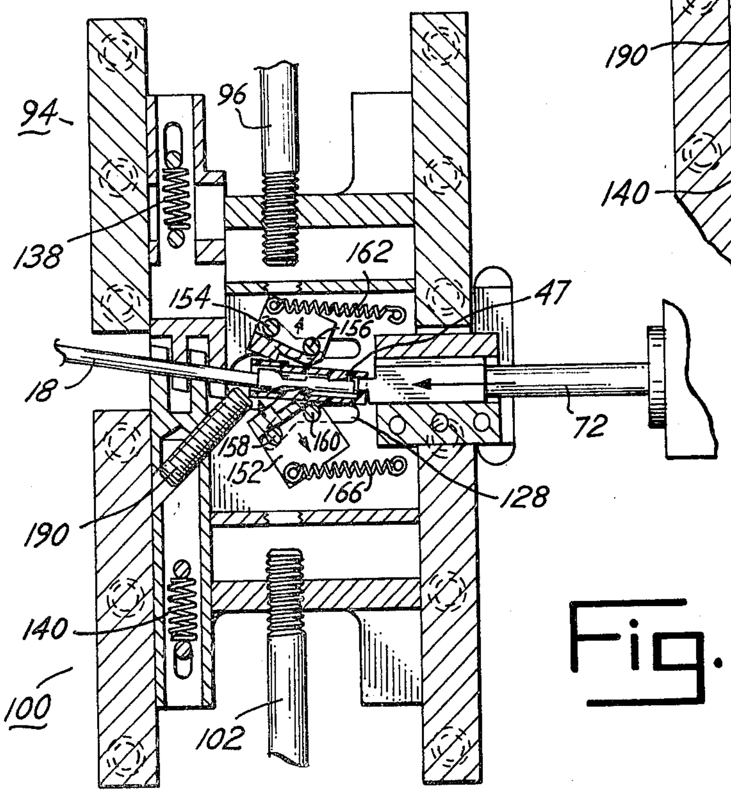
Fig. 11

DEVICE FOR ATTACHING INSULATOR PODS TO WIRE TERMINALS

BACKGROUND OF THE INVENTION

Prefabricated wires and wire harnesses are made for many electrical appliances, and are used both in the original assembly of the appliances and in the replacement of worn out wires or wire harnesses in used appliances. For example, in appliances such as washers, dryers, stoves and the like, the wires which form the electrical connections between the various components, such as the electric consuming devices and the appliance controls, are often manufactured by independent wire manufacturers and are supplied to the appliance manufacturer in pre-cut lengths as required. Normally, the wires are fitted by the wire supplier with a terminal or connector to permit immediate attachment of the wire to a post or other terminal on the appliance. Rapid connect fittings are often used, wherein the terminal on the wire is either a male or female part which interlocks with a female or male part, respectively, on a post in the appliance. Hence, when the wire is being installed between the components of the electrical appliance, the wire can be snapped into place quickly and requires no time consuming operations of wire stripping, terminal connecting or the like.

Safety considerations arise from the snap-on fitting type prefabricated wires in that the male and female terminals or connectors normally are entirely of metal. Hence, exposed electrical conducting parts are present in the appliance when the wires are in place thereon, unless some type of electrical insulation is provided. The exposed metal connections are a potential cause of electrical shock, in that many of the other components of an appliance are metal, including the housing and other surfaces subject to frequent human contact.

For these and other reasons one of the terminals is normally provided with an electrically insulative plastic jacket, commonly referred to as a pod, which permits another terminal to be inserted therein. The pod encases the assembled metal terminals and prevents electric shock. Normally one of the terminals and the pod are constructed so that the pod will slide over the terminal and lock in place thereon. Thus, the wires are cut to length and stripped, a terminal is connected thereto, generally by some type of crimp-on connection, and the pod is slid in place and locked onto the terminal.

Measuring the appropriate length of wire, cutting the wire, stripping the ends thereof and attaching the terminal or terminals thereto normally are operations which can be performed mechanically. Thus, in a given length of time, one worker operating a wire cutter and terminal attacher can produce a large volume of pre-cut wires with terminals attached. Prior to this time, however, the assembly of the pod on the terminal has been performed manually. A worker physically applies a pod to each terminal, which normally requires that the worker grasp the wire and a pod, place the pod over the end of the terminal, slide the pod onto the terminal and slightly twist or bend the pod and terminal to lock the pod in place on the terminal. The manual installation of each pod to each terminal is slow and inefficient, and one worker frequently cannot attach pods as quickly as machines produce the pre-cut wires with terminals thereon. Hence, even though the cost for making a pod does not add significantly to the cost of each wire produced with a pod thereon, the physical labor required in attaching the pod to the terminal substantially increases the cost for the production of wires. Unfortunately, prior to this time manual assembly was the only known method for installing insulator pods on terminals of wires.

SUMMARY OF THE INVENTION

It is therefore one of the principal objects of the present invention to provide a device which mechanically attaches insulator pods to terminals on wires, and which can be attached to wire cutting and terminal attaching machines to attach the pods to the terminals as the pre-cut wires come from the wire cutter and terminal attacher.

Another object of the present invention is to provide a device for attaching insulator pods to terminals on wires which operates automatically without the need for continuous operator action, and which is relatively simple and dependable in operation, thereby experiencing little mechanical difficulty or breakdown during operation.

These and other objects are accomplished in the present invention by providing a pod aligning and supply mechanism for orienting each pod from a plurality of pods in appropriate position for attachment to terminals on wires, and for bringing the pods to a pod attaching mechanism. The wires, with terminals thereon, coming from the wire and terminal attaching machines are grasped first by a wire gripper and then by a terminal gripper. A plunger or shaft shoves a pod onto the terminal, which action releases the terminal gripper, allowing the pod to fully encase the terminal. To provide the twist or bend which a worker almost unknowingly applies to the pod when locking the pod manually on the terminal, as the pod moves rearwardly on the terminal, the leading edge of the pod engages an inclined surface which tilts the pod upwardly, causing the pod to lock onto the terminal. The pod attaching device is operated pneumatically from the air system of the wire cutter and terminal attacher and is electrically timed in operation to work in synchronism with the wire cutting, stripping and terminal attaching operations of the production machine.

Additional objects and advantages of the present invention will become apparent from the following detailed description and the accompanying drawings.

BRIEF DESCRIPTION OF THE DRAWINGS

FIG. 1 is a top plan view of a device for attaching insulator pods to wire terminals embodying the present invention;

FIG. 2 is an elevational view of the insulator pod attaching device shown in FIG. 1;

FIG. 9 is a vertical cross sectional view similar to that of FIG. 7, but showing the device at the start of a cycle for attaching a pod, with the pod in position and a wire having entered the device;

FIG. 10 is a cross sectional view similar to that of FIG. 9 but showing the device after the start of the cycle, wherein the wire and terminal are gripped and movement of the pod has commenced;

FIG. 11 is a cross sectional view similar to those of FIGS. 9 and 10 but showing the device near completion of a pod attaching cycle.

DETAILED DESCRIPTION OF THE PREFERRED EMBODIMENT

Figure 3:
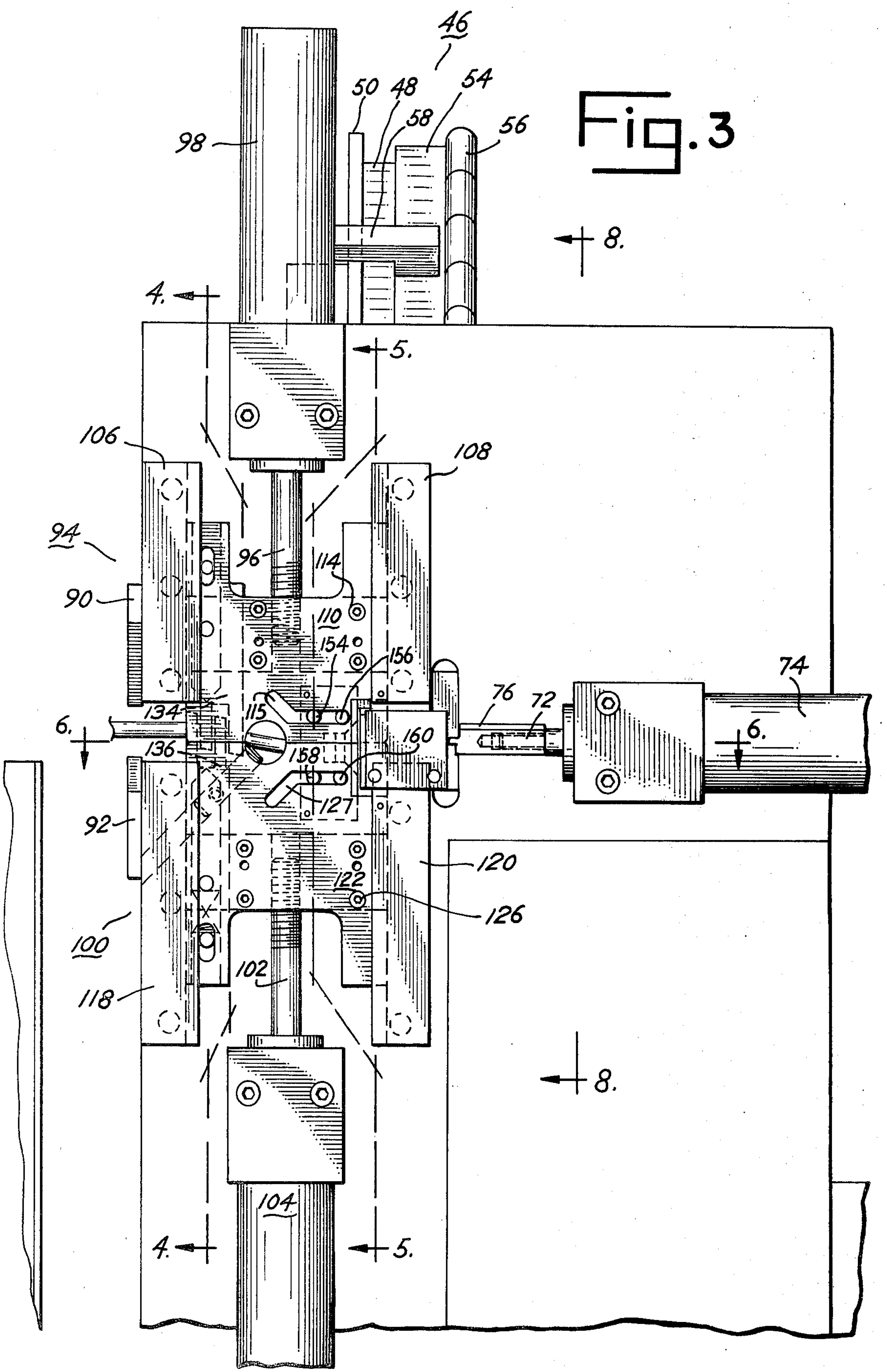
FIG. 3 is an enlarged fragmentary elevational view of the device taken along line 3—3 of FIG. 1.

Referring now more specifically to the drawings, and to FIGS. 1, 2 and 3 in particular, numeral 10 designates a device for attaching insulator pods to wire terminals embodying the present invention, which broadly includes a pod aligning and supply mechanism 12, a wire and terminal grasping mechanism 14 and a pod attaching mechanism 16. The present device for attaching insulator pods may be installed on, for operation with, a wire cutter and terminal attacher machine. Wires 18 are cut to length and stripped of insulation on an end, and a terminal 20 is attached to the stripped end by a crimp connection. The present device mounts on the frame of the wire cutter, on the outfeed carriage portion thereof, so that the ends of the wires with terminals attached thereto enter the device and receive an insulator pod from the device. Thus, a suitable frame 22 having adjustment mechanisms 24 and 26 is provided for mounting the present device on the wire cutter. The adjustment mechanisms are used for properly positioning the pod attaching device so that a pod may be attached to the terminal when the wire with terminal thereon is in a stopped position on the carriage. The conventional wire cutter outfeed carriage moves a plurality of wires in an interrupting, step-by-step type movement, wherein the wires move about six inches, stop for a period of time and then proceed onward another six inches. When the carriage is stopped, the machine is performing various functions, such as cutting an appropriate length of wire from a supply spool, baring the end of the wire by stripping the insulative coating from the wire and attaching a terminal to the stripped end, usually by a crimp type connection. Hence, six, eight or more wires may be on the carriage at one time, the last of which is released into a receiving pan, and the present device should be accurately positioned on the outfeed carriage to receive each wire as it moves along the carriage and to attach a pod when the wire is stopped. The device will normally be operated from the same pneumatic source as the wire cutter, and the timing of all functions such as wire cutting, stripping, terminal attaching and pod attaching is synchronized. Although the present device is described herein for operation on a wire cutter and terminal attacher, it should be understood that in some applications it may be advantageous to operate the pod attacher independently from other machines, with either an automatic infeed of wires with terminals thereon or manual infeed by an operator. Operator of the present device on a wire cutter is described merely as a particularly advantageous application of the invention.

Figure 6:
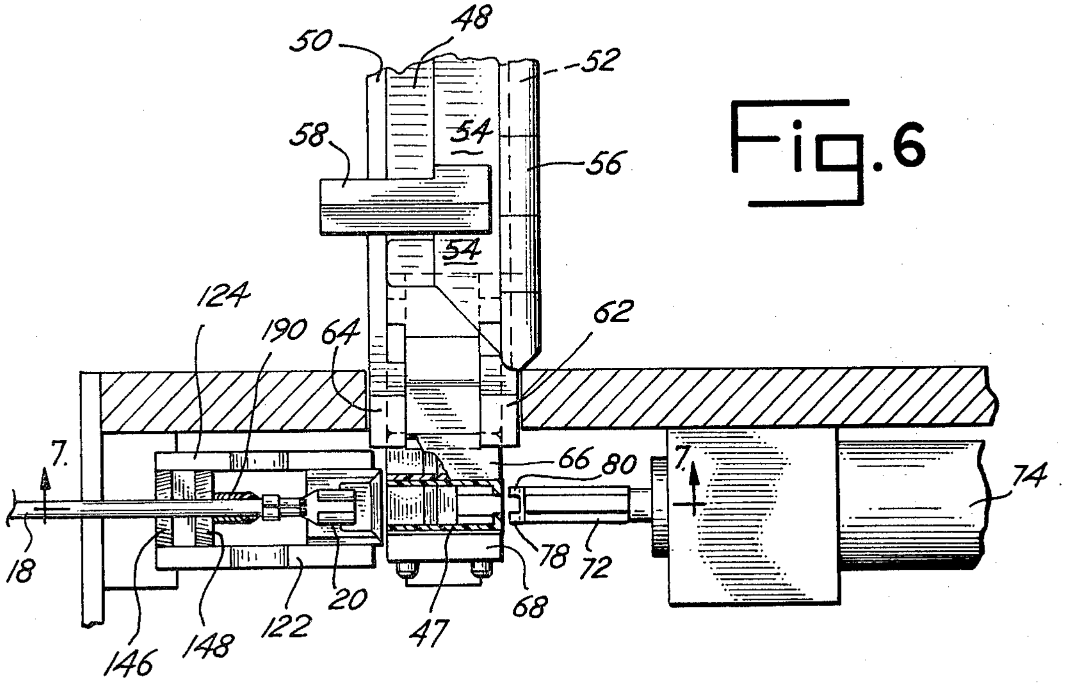
FIG. 6 is a cross sectional view of the insulator pod attaching device taken on line 6—6 of FIG. 3.
Figure 8:
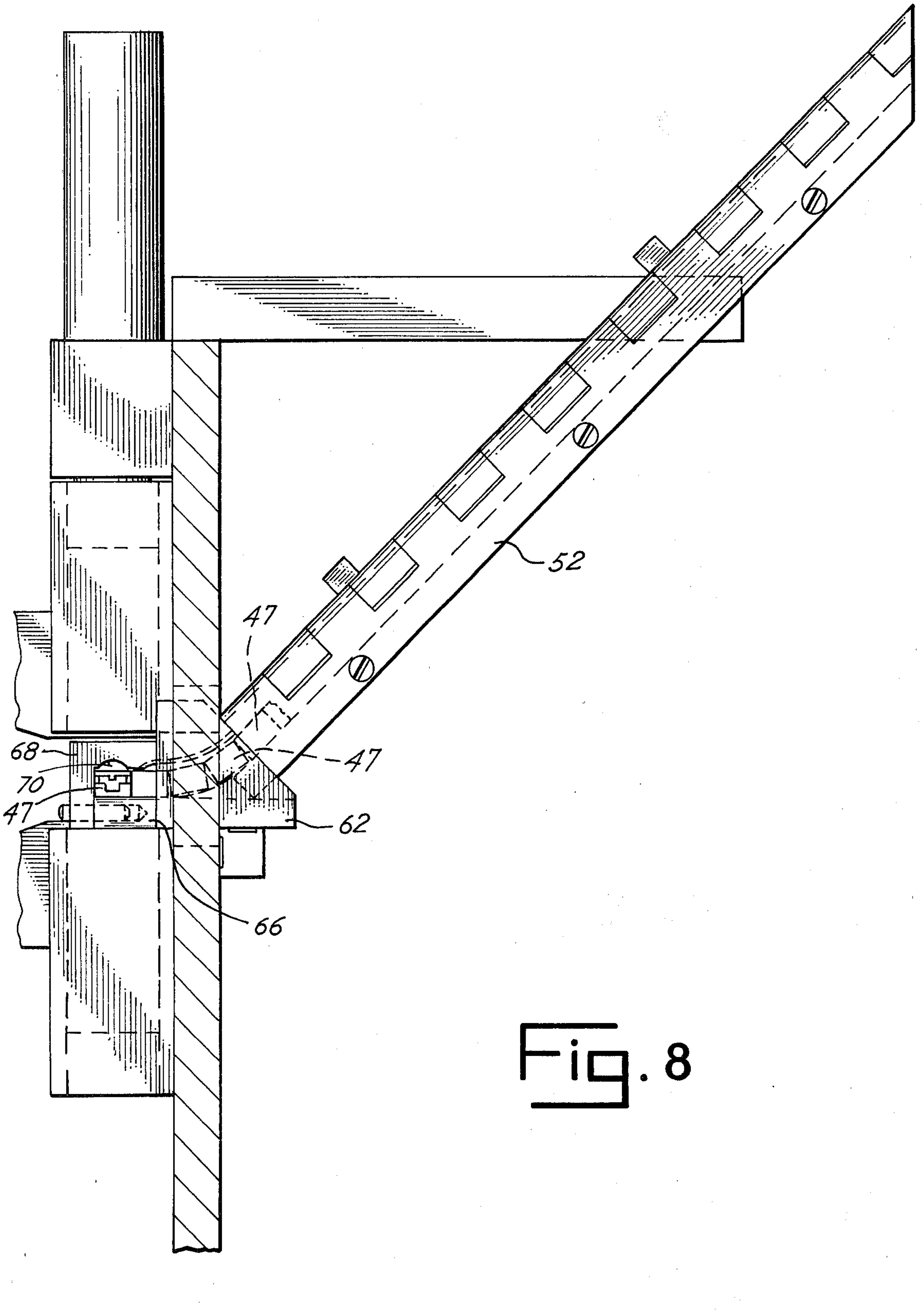
FIG. 8 is a cross sectional view taken on line 8—8 of FIG. 3.

The pod aligning and supply mechanism may be any of several types; however, a particularly advantageous mechanism shown in the drawings includes a vibratory bowl 40 connected by legs and/or braces 42 and 44 to frame 22. The vibratory bowl is a conventional apparatus into which a quantity of the insulator pods may be placed. The pods are maneuvered by moving mechanisms in the vibratory bowl to be aligned in a consistent order. Normally, the vibratory bowl is disposed above pod attaching mechanism 16, and a chute 16 extends from the outlet of the vibratory bowl to the pod attaching mechanism. The pods, having been arranged in the proper position by the vibratory bowl, slide down the chute to the pod attaching mechanism for engagement with terminal 20. A plurality of pods have been shown in FIG. 8 and designated with the numeral 47. The chute includes a bottom plate 48, and side walls 50 and 52. It is preferred that the chute be at least partially covered by cover sections 54, connected by a hinge 56 to side wall 52. Cover stop bars 58 extend from cover sections 54 to side wall 50. The hinged covers provide protection for the chute and the pods therein, yet permit access along the length of the chute to clear jam-ups or other malfunctions associated with the chute. The lower end of chute 46 includes right and left curved track sections 62 and 64, (FIG. 6) which direct the pods from the angular position at which they slide down the chute to a flat position for engaging the terminal. A track end piece 66 on which the last pod in the line of pods from the chute rests prior to engagement with a terminal, and a stop piece 68 which forms a barrier at the end and side of the chute for stopping the pod for proper alignment to engage a wire terminal comprise the lower end of chute 46. A hole 70 (FIG. 8) is disposed in stop piece 68 to permit a shaft 72 from a cylinder 74 to move against the pod, thereby acting as a plunger to move the pod in the direction of terminal 20 on wire 18. Hence, the vibratory bowl and chute orient the pods for proper engagement with the terminal, and position the pods in the proper location for connection to the terminal. It will be understood by those skilled in the art that other types of pod aligning and supply mechanisms may be used, such as pods aligned on and attached to a tape or other supply roll carrier. In some applications it may be desirable to have the pod hand loaded by the operator of the machine; however, normally, the mechanical arrangement and alignment of the pods by a pod aligning and supply mechanism are preferred.

Shaft 72 includes a pod engaging pusher 76 having dogs 78 and 80 which enter the end of the pod as the pod is moved onto the terminal. The dogs are only slightly longer than the thickness of the end wall of the pod and act as an abutment against the end of the terminal to prevent the end of the terminal from striking the end wall of the pod and possibly cracking the pod.

Figure 12:
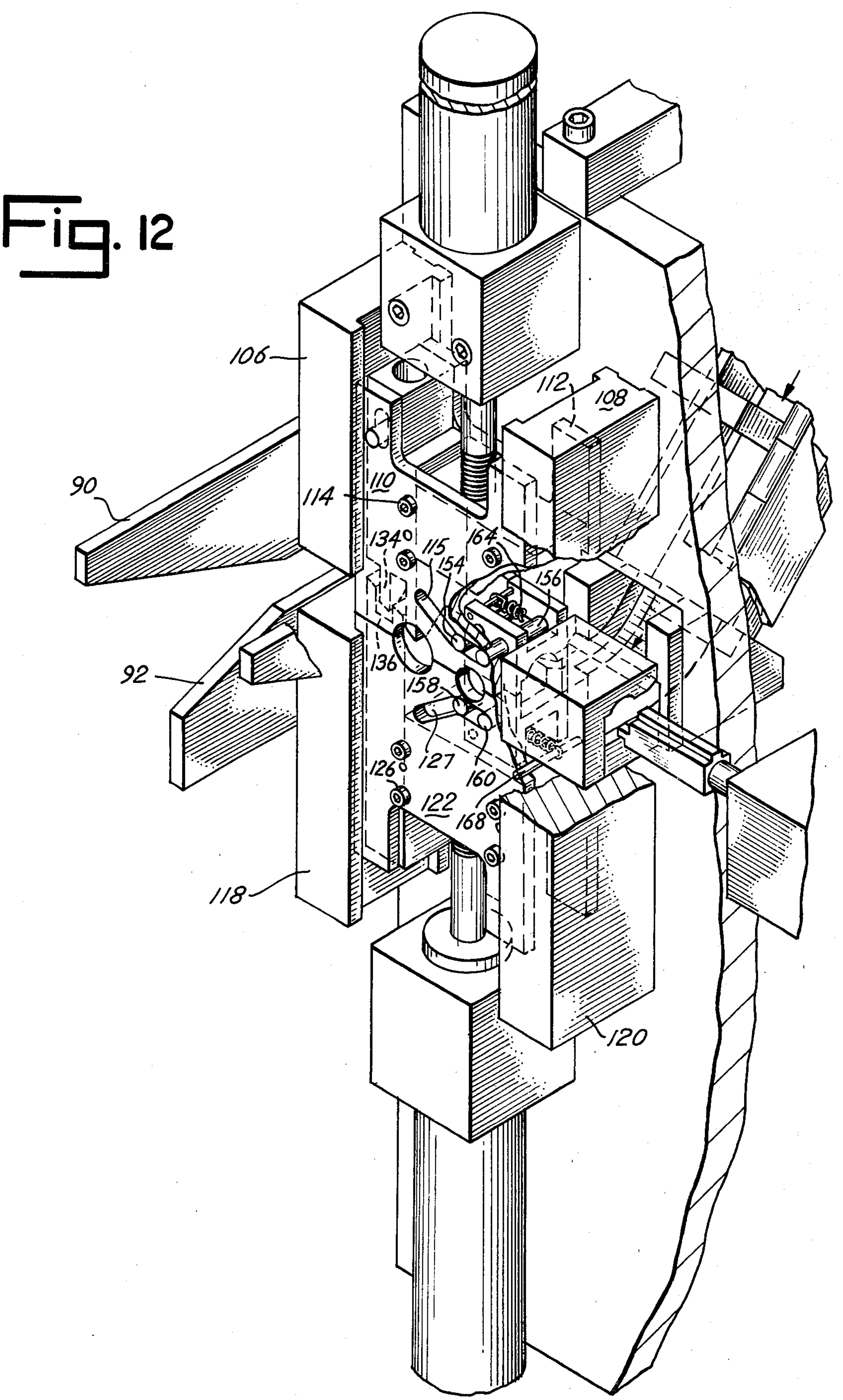
FIG. 12 is a perspective view, partially broken away, of the device for attaching insulator pods to wire terminals embodying the present invention.

The present device is mounted on the wire cutter carriage and receives the wires with terminal thereon at one of the locations along the carriage at which the wires are momentarily stopped. Upper and lower wire guides 90 and 92, (FIG. 12), are provided and have surfaces angling inwardly toward the wire and terminal grasping mechanism for guiding the wire into the general area of the grasping mechanism. Wire and terminal grasping mechanism 14 includes an upper assembly 94 which is moved by a shaft 96 from a cylinder 98, and a lower assembly 100 moved by a shaft 102 of a cylinder 104. The upper and lower assemblies are in positions away from each other as the wire enters the present device, thus providing an opening therebetween. When the wire is in a stopped position within the device, the upper and lower assemblies are moved toward each other to grasp the wire and permit the attachment of a pod to the terminal. The initial open position for receiving a wire is shown in FIG. 9.

Upper assembly 94 is disposed between left and right housing members 106 and 108, respectively. The designations left and right will be used herein to distinguish parts near the carriage and the wire 18 or terminal 20 from similar parts nearer cylinder 74. The designations of left and right are used only for clarity in the description and are relative only to the views as shown in the drawings. Similarly, designations of front and back will be used for similar parts to differentiate those closer to the side from which the wires enter the device from those closer to the side to which the wires exit the device.

Upper assembly 94 includes front and back upper side plates 110 and 112 disposed between left and right housing members 106 and 108 which, together with a cylinder connecting block 113 attached to the plates by a plurality of bolts 114 and to shaft 96 by threaded attachment, slide in channels in the housing members. Operation of cylinder 98 to extend or retract shaft 96 moves upper assembly 94 in the channels in housing members 106 and 108. The upper side plates have slots 115 and 116, respectively, therein, and each of the slots has a horizontal portion to the right and an angular portion to the left, the angular portions extending approximately 45° upwardly from the horizontal portions.

Lower assembly 100 is disposed between left and right housing members 118 and 120, and includes front and back lower side plates 122 and 124 disposed between and slidable in the housing members. A cylinder connecting block 125 is attached to the plates by a plurality of bolts 126 and to shaft 102 of cylinder 104 by threaded attachment. Operation of cylinder 104 moves lower assembly 100 in channels in housing members 118 and 120. The lower side plates are similar to upper side plates 110 and 112, having slots 127 and 128 therein. The slots have horizontal portions and angular portions to the right and left respectively, but the angular portions extend downwardly from the horizontal portion of an angle of about 45°.

Figure 7:
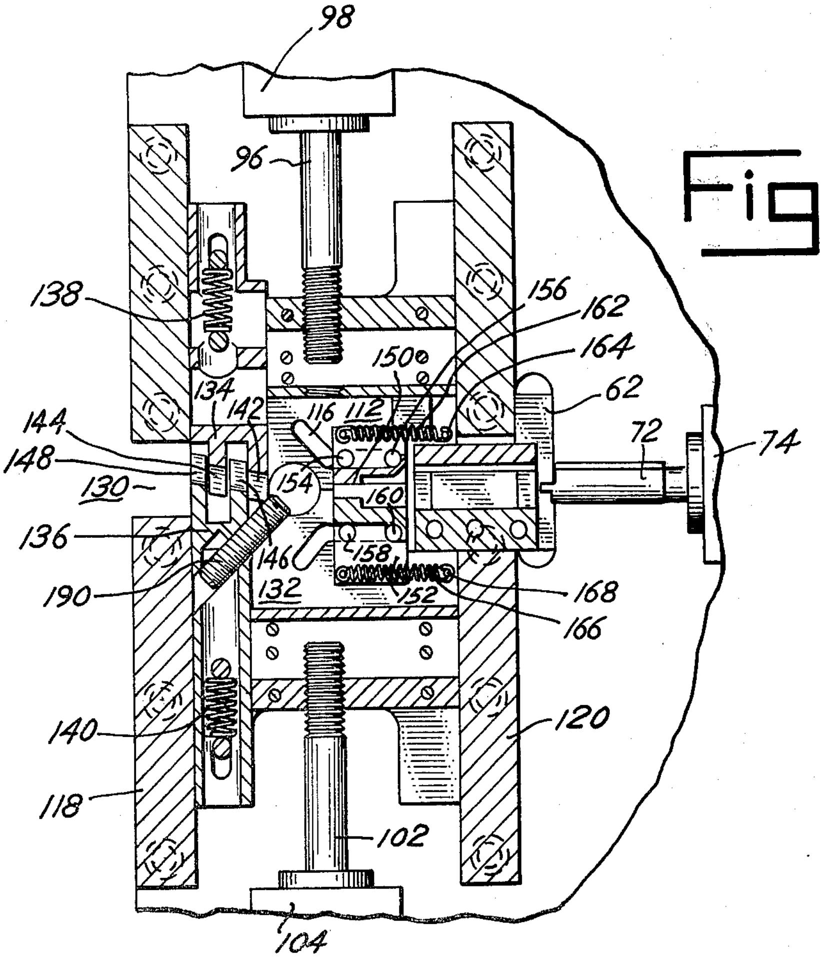
FIG. 7 is a vertical cross sectional view of the device shown in FIG. 6, taken on line 7—7 of the latter figure.

A wire gripper 130 and a terminal gripper 132 are connected to the upper and lower assemblies and operate therebetween to hold the wire and terminal in position for receiving an insulator pod. The grippers are most clearly shown in FIGS. 3 and 7, which show the front parts and back parts respectively. The wire gripper includes an upper wire clamp section 134 and a lower wire clamp section 136 connected to the upper and lower assemblies respectively. The wire clamp sections are spring loaded by springs 138 and 140 to provide a cushioned, yet firm grip on the wire. Each of the wire clamp sections includes two V-shaped portions for receiving the wire, and when the sections are brought together, the wire is gripped therebetween. Hence, upper wire clamp section 134 includes downwardly opening V portions 142 and 144 and lower wire clamp section 136 includes upwardly opening V portions 146 and 148. Each pair of V portions is angled at approximately 8° relative to a horizontal axis, so that when the wire is held between the V portions when the upper and lower assemblies are together the wire is at approximately an 8° angle. This can be clearly seen in FIGS. 10 and 11 which show wire 18 held between the upper and lower wire clamp sections and angling upwardly at approximately 8°. As can be further seen in FIGS. 10 and 11, when upper assembly 94 and lower assembly 100 are brought together, V portions 142, 144, 146 and 148 are disposed adjacent each other, thus providing a secure grip on the wire behind the terminal.

Figure 4:
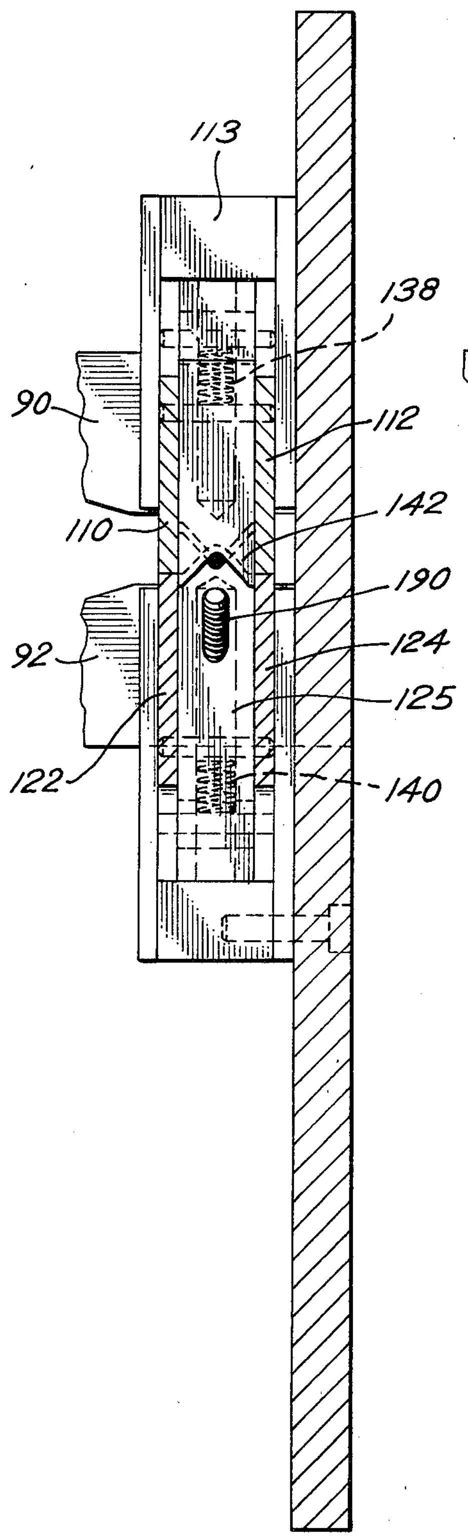
FIG. 4 is a cross sectional view of the device shown in FIG. 3, taken on line 4—4 of the latter figure.
Figure 5:
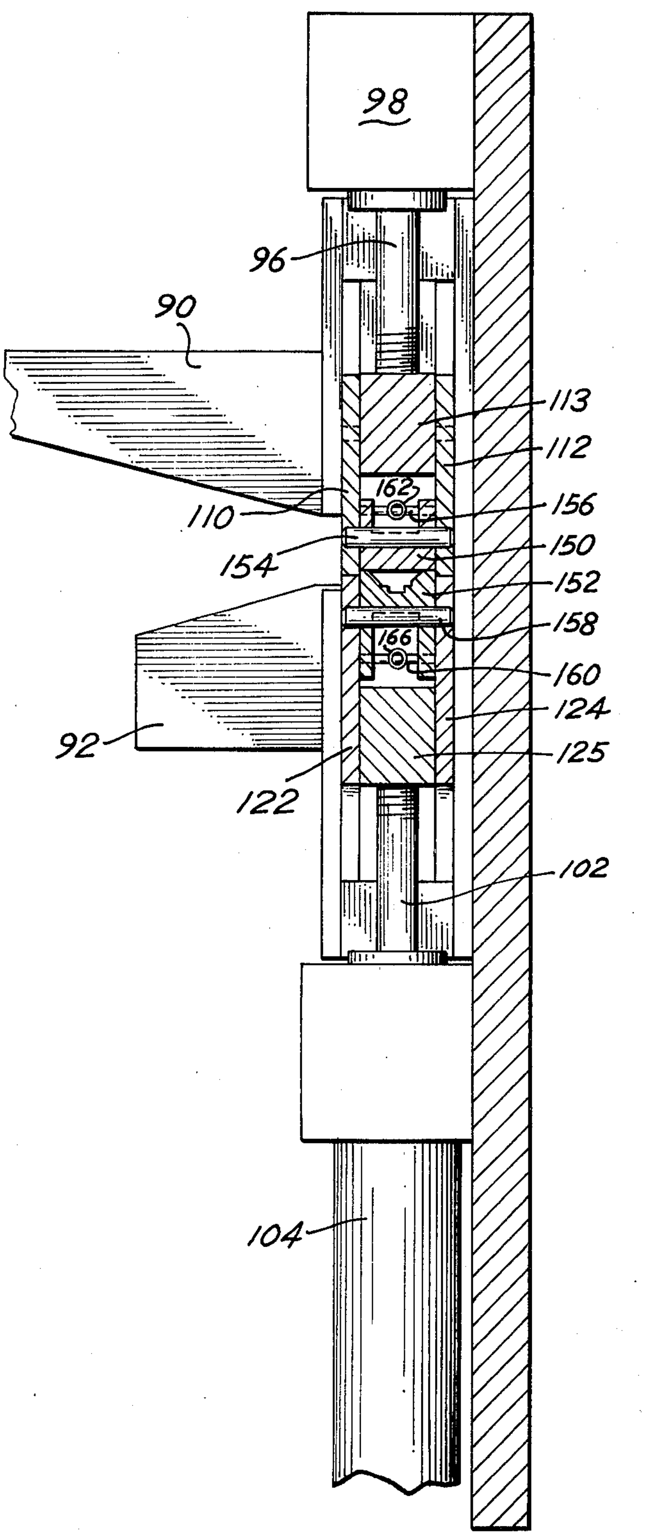
FIG. 5 is a cross sectional view of the device shown in FIG. 3, taken on line 5—5 of FIG. 3.

The V configuration for the wire clamp sections is just described and as shown in FIG. 4 is the preferred type of wire clamping means, in that as the V sections are brought together, the tapered walls forming the V will center the wire therebetween, thereby correctly positioning the wires to receive a pod on the terminal at the end thereof. To insure the proper positioning of the wire, it is preferred that the V portions of the wire gripper close slightly before terminal gripper 132. Thus, at the start of the cycle the wire is gripped first, thereby more precisely positioning the terminal at the end of the wire for proper reception of an insulator pod. The terminal gripper, to be described subsequently, closes after the wire gripper to securely grip the terminal in the precise position required for receiving a pod.

Terminal gripper 132 includes an upper terminal clamp section 150 movably disposed between front and back upper side plates 110 and 112, and a lower terminal clamp section 152 movably disposed between front and back lower side plates 122 and 124. When the upper and lower sections are brought together a cavity is formed of a size and shape to securely hold a terminal therein. Upper terminal clamp section 150 includes dowel pins 154 and 156 which extend outwardly from both the front and back sides of the body of the upper terminal clamp section and extend into slots 115 and 116. Lower terminal clamp section 152 includes dowel pins 158 and 160 which extend outwardly from the body of the lower terminal clamp section into slots 127 and 128 of the lower side plates. A spring 162 is connected between upper terminal clamp section 150 and a pin 164 connected to the front and back upper side plates 110 and 112, and a spring 166 is disposed between lower terminal clamp section 152 and a pin 168 between the front and back lower side plate members 122 and 124. Springs 162 and 166 urge the upper and lower terminal clamp sections to the right as shown in the drawings, so that the pins are disposed in the horizontal portions of the slots in the side plates. Force exerted on the upper and lower terminal clamp sections from the right, as shown in the drawings, will move the clamp sections to the left, and as the dowel pins move from the horizontal portions of the slots to the angular portions of the slots, the upper and lower terminal clamp sections will move either upwardly or downwardly away from the terminal at a 45° angle. Thus, the terminal gripper holds the terminal in proper position for receiving a pod thereon, and as the pod is pushed onto the terminal, the point at which the terminal is grasped by the terminal gripper moves rearwardly, and finally the terminal grippers move away from the terminal, permitting the pod to enclose the entire length of the terminal.

To lock the pod onto the terminal, a lip 180 in the cavity of pod 47 (FIG. 9) must be slid over a pin 182 on the terminal. As the pod slides over the terminal, pin 182 will bend toward wire 18, thus permitting lip 180 to slide over the pin. After the lip has slid over the pin, the pod cannot be removed in that, as the pod is pulled off the terminal, lip 180 engages pin 182, which cannot be bent away from wire 18 as a result of the resistance to movement in that direction from the angular pin and the restricted space between the terminal and the inner wall of the pod. When applying a pod by hand, the production worker tilts the leading edge of the pod toward the wire to assist in sliding lip 180 past pin 182. To duplicate this movement in the present invention a set screw 190 is disposed in lower assembly 100, between lower wire clamp section 136 and lower terminal clamp section 152. Set screw 190 is adjusted so that the end of the pod encounters the set screw and is forced upwardly as it is moved onto the terminal. This motion of the pod relative to the terminal duplicates that motion performed instinctively by a worker when the pods are attached by hand.

In the use and operation of a device for attaching insulator pods to wire terminals embodying the present invention, as best illustrated in FIGS. 9 through 12, frame 22 is attached to the carriage frame of a wire cutter and is positioned thereon through movement of adjustment mechanisms 24 and 26 to be in proper position for attaching a pod to a wire terminal when the carriage motion is stopped. As each wire moves along the carriage toward the receiving pan at the end of the carriage, the ends with terminals thereon pass through device 10 and are fitted with an insulator pod. When attachment of pods is to begin, a plurality of pods are dumped into vibratory bowl 40 which arranges the pods in the appropriate position and discharges the pods through chute 46 to pod attaching mechanism 16. After a period of operation the chute will be substantially filled, with the lowermost pod therein resting on track end piece 66 and against stop piece 68. In this position the pod is in readiness for attachment to a terminal. As the ends of the wires near the device, upper and lower wire guides 90 and 92 direct the wires between upper and lower assemblies 94 and 100 which are in a retracted position in their respective housing members in that shafts 96 and 102 of cylinders 98 and 104 are retracted. This position is illustrated in FIG. 9. The operation of the present device is connected with the operation of the wire cutting machine, and will have the same timing as the functions of the wire cutting machine. Hence, when the carriage stops, shafts 96 and 102 are extended outwardly from cylinders 98 and 104, thereby bringing upper and lower assemblies 94 and 100 into engagement. As the two assemblies come together upper wire clamp section 134 and lower wire clamp section 136 close slightly before upper and lower terminal clamp sections 150 and 152 so that wire 18 is centered in the V's of the clamp sections, thus bringing the end of the wire and terminal 20 into the approximate location required for receiving a pod. The upper and lower wire clamp sections are held firmly against the wire by springs 138 and 140 but will not damage the insulative coating on the wire. Terminal gripper 132 closes slightly after the wire gripper closes and, as the terminal gripper closes, upper terminal clamp section 150 and lower terminal clamp section 152 come together and surround the terminal along approximately the entire length thereof.

After the upper and lower assemblies have been brought together, so that the wire and terminal are firmly gripped therebetween, cylinder 74 is operated to extend shaft 72 through hole 70. Dogs 78 and 80 enter the right end of the pod as shown in FIG. 10 and the pusher moves the pod farther to the left. Upper and lower terminal clamp sections 150 and 152 are encountered by the moving pod and are first moved rearwardly and then either upwardly or downwardly away from the terminal. Thus, the terminal is held firmly at all times, either by the terminal gripper or by the pod. Movement of the clamp sections away from the terminal occurs as the sections are moved to the left and pins 154, 156, 158 and 160 slide in slots 115, 116, 127 and 128 and move from the horizontal portions of the slots into the angular portions. As the pod moves yet farther to the left, the leading end of the pod encounters set screw 190 which, being disposed at an angle relative to the path of travel of pod 47, raises the end of the pod, thus facilitating the passage of lip 180 past pin 182. At the end of the stroke of cylinder 74 the pod is fully in position on the terminal. The shaft of cylinder 74 then retracts, upper and lower assemblies 94 and 100 move away from each other, and the wire having a terminal now fitted with an insulator pod is moved by the carriage of the wire cutter outwardly from the machine, and the next wire with terminal is moved into position as shown in FIG. 9 for the attachment of another pod.

The present device can attach pods to wire terminals as fast as the wire cutter cuts appropriate lengths of wire, strips the wire and attaches a terminal. Hence, the step of adding an insulator pod to the terminal requires no additional time or labor beyond that time required for producing wires having terminals without insulator pods. The operator of the wire cutting machine normally will have no difficulty in overseeing the operation of the pod attacher as well, and can keep vibratory bowl 40 adequately supplied with pods without adversely affecting his or her attention on the other operations of the machine.

Although one embodiment of a device for attaching insulator pods to wire terminals has been shown and described in detail herein, various changes may be made without departing from the scope of the present invention.

I claim:

1. In a device for attaching insulator pods to wires having terminals thereon, the combination of upper and lower terminal gripping assemblies having means with slots therein and means with pins disposed in the slots of said upper and lower assemblies, means for supporting said gripping assemblies, means for moving said assemblies to and from a terminal gripping position, means for moving a pod longitudinally into engagement with said gripping assemblies and in alignment with a terminal held therein, each of said slots having an initial portion parallelling the terminal and an angular portion extending away from the terminal when in gripped position, said upper and lower assemblies initially gripping the terminal along the length thereof and adapted to move said grip rearwardly along the terminal when said pins are in said parallel slot portions and to pivot away from the terminal by way of said angular slot portion when said pins are in said angular slot portion, utilizing said pivoting motion to transfer the grip from the terminal to the pod, said pivoting motion being initiated by the force exerted on said upper and lower assemblies by the advancing pod.

2. In a device for attaching insulator pods to wires having terminals thereon as defined in claim 1 in which said means for moving a pod longitudinally includes an axially movable shaft for pushing said pod onto the terminal.

3. In a device for attaching insulator pods to wires having terminals thereon as defined in claim 2 in which said axially movable shaft has protruding dogs for pushing and protecting said pods.

4. In a device for attaching insulator pods to wires having terminals thereon as defined in claim 1 in which said means for moving a pod longitudinally includes an axially moveable shaft for pushing said pod onto the terminal.

5. In a device for attaching insulator pods to wires having terminals thereon as defined in claim 2 in which said axially moveable shaft has protruding dogs for pushing and protecting said pods.

6. In a device for attaching insulator pods to wires having terminals thereon as defined in claim 4 in which a means is provided, including a vibratory bowl for arranging a plurality of pods in a preselected arrangement, and a chute extending downwardly from said vibratory bowl to a point between said shaft and said clamp sections.

7. In a device for attaching insulator pods to wires having terminals thereon as defined in claim 6 in which a means is provided for tilting the pod being placed on the terminal.

8. In a device for attaching insulator pods to wires having terminals thereon, the combination of upper and lower terminal gripping assemblies having upper and lower terminal clamp sections, respectively, means supporting said assemblies for movement relative to one another, means for moving said assemblies between an open position and a terminal gripping position, means for moving a pod longitudinally into engagement with said clamp sections and in alignment with a terminal gripped therein, each clamp section having a guide means including an initial portion parallelling the terminal and an angular portion extending away from the terminal when in gripped position, said upper and lower clamp sections initially gripping the terminal along the length thereof and adapted to move said grip rearwardly along the terminal when said guide means portion is in said parallel position and to pivot away from the terminal when said guide means portion is in said angular position, utilizing said pivoting motion to transfer the grip from the terminal to the pod, said pivoting motion being initiated by the force exerted on said upper and lower assembly sections by the advancing pod.

9. In a device for attaching insulator pods to wires as defined in claim 8 in which a wire gripper is included for holding the wire behind the terminal.

10. In a device for attaching insulator pods to wires having terminals thereon as defined in claim 9 in which said wire gripper includes upper and lower sections which are brought into proximity with each other to hold the wire, and being adapted to grasp and center the wire before said terminal clamp sections grip the terminal.

11. In a device for attaching insulator pods to wires having terminals thereon as defined in claim 8 in which a vibratory bowl is provided for orienting a pod.

12. In a device for attaching insulator pods to wires having terminals thereon as defined in claim 11 in which a chute extends between said vibratory bowl and said gripping assemblies for moving a pod, and the pods slide from said vibratory bowl to said gripping assemblies at the end of said axially moveable shaft for movement onto the terminal.

13. In a device for attaching insulator pods to wires having terminals thereon as defined in claim 12 in which a frame adapted for attachment to a wire cutter and terminal attacher is provided.

14. In a device for attaching insulator pods to wires having terminals thereon as defined in claim 9 in which said wire gripper and said terminal gripping assemblies each includes upper and lower sections which are brought into proximity with each other to hold the wire and terminal, said wire gripper sections being adapted to grasp and center the wire before said terminal clamp sections grip the terminal.

15. In a device for attaching insulator pods to wires having terminals thereon as defined in claim 8 in which a means is provided for tilting the pod as it moves onto the terminal.

* * * * *